United States Patent
Kawamoto et al.

(10) Patent No.: US 7,990,678 B2
(45) Date of Patent: Aug. 2, 2011

(54) SEMICONDUCTOR CERAMIC AND MULTILAYERED-TYPE SEMICONDUCTOR CERAMIC CAPACITOR

(75) Inventors: Mitsutoshi Kawamoto, Otsu (JP); Shinsuke Tani, Takatsuki (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 280 days.

(21) Appl. No.: 12/145,283

(22) Filed: Jun. 24, 2008

(65) Prior Publication Data

US 2008/0248286 A1    Oct. 9, 2008

Related U.S. Application Data

(63) Continuation of application No. PCT/JP2006/324732, filed on Dec. 12, 2006.

(30) Foreign Application Priority Data

Dec. 28, 2005   (JP) .................................. 2005-377538

(51) Int. Cl.
  *H01G 4/06*    (2006.01)
(52) U.S. Cl. .................................. 361/321.4; 361/321.5
(58) Field of Classification Search .................. 361/311, 361/321.1, 321.2, 321.3, 321.4, 321.5
  See application file for complete search history.

(56) References Cited

U.S. PATENT DOCUMENTS 6,160,472 A  *  12/2000  Arashi et al. .................. 338/21

FOREIGN PATENT DOCUMENTS

| JP | 61-26208 | 6/1986 |
|---|---|---|
| JP | 1063204 | 3/1989 |
| JP | 1-187914 | 7/1989 |
| JP | 5-82386 | 4/1993 |
| JP | 07069635 A  *  | 3/1995 |
| JP | 8-330107 | 12/1996 |
| JP | 9-219336 | 8/1997 |
| JP | 2689439 | 8/1997 |
| JP | 2707706 | 10/1997 |
| JP | 2707707 | 10/1997 |
| JP | 10-64703 | 3/1998 |
| JP | 11-302072 | 11/1999 |
| JP | 11302072 | 11/1999 |
| JP | 2005-158895 | 6/2005 |
| JP | 2005-158896 | 6/2005 |
| JP | 2005-158897 | 6/2005 |

* cited by examiner

*Primary Examiner* — Eric Thomas
(74) *Attorney, Agent, or Firm* — Dickstein Shapiro LLP

(57) ABSTRACT

A semiconductor ceramic has a mixing molar ratio m between the Sr site and the Ti site satisfying the relationship $1.000 \leq m < 1.020$, a donor element in an amount of 0.8 to 2.0 moles relative to 100 moles of the Ti element dissolved in the Sr site to form a solid solution, the donor element having a higher valency than the Sr element, a transition metal element, such as Mn, incorporated in an amount of 0.3 to 1.0 mole relative to 100 moles of the Ti element so as to be segregated in grain boundaries, and an average grain size of crystal grains is 1.0 μm or less. A component body in which semiconductor ceramic layers are stacked and internal electrodes 2 are embedded provides a $SrTiO_3$-based grain boundary insulation type semiconductor ceramic having a high apparent relative dielectric constant of 5,000 or more even if the average grain size of crystal grains is decreased to 1 μm or less, and a semiconductor ceramic capacitor in which it is possible to achieve both a reduction in layer thickness and improvement in dielectric characteristics by using the $SrTiO_3$-based grain boundary insulation type semiconductor ceramic.

20 Claims, 1 Drawing Sheet

SEMICONDUCTOR CERAMIC AND MULTILAYERED-TYPE SEMICONDUCTOR CERAMIC CAPACITOR

This is a continuation of application Serial No. PCT/JP2006/324732, filed Dec. 12, 2006.

TECHNICAL FIELD

The present invention relates to a semiconductor ceramic and a multilayered-type semiconductor ceramic capacitor. More particularly, the invention relates to a $SrTiO_3$-based grain boundary insulation type semiconductor ceramic and a multilayered-type semiconductor ceramic capacitor using the same.

BACKGROUND ART

With developments in electronics technology in recent years, the size of electronic components has been reduced rapidly. In the field of multilayered-type ceramic capacitors, there have also been increased demands for smaller size and higher capacitance. Consequently, ceramic materials having a high relative dielectric constant have been undergoing development, and efforts have been made to reduce the thickness of dielectric ceramic layers and increase the number of dielectric ceramic layers to be stacked.

For example, Patent Document 1 proposes a dielectric ceramic represented by the general formula: $\{Ba_{1-x-y}Ca_xRe_yO\}_m TiO_2 + \alpha MgO + \beta MnO$ (where Re represents a rare-earth element selected from the group consisting of Y, Gd, Tb, Dy, Ho, Er, and Yb, and $\alpha$, $\beta$, m, x, and y, respectively, satisfy the relationships $0.001 \leq \alpha \leq 0.05$, $0.001 \leq \beta \leq 0.025$, $1.000 < m \leq 1.035$, $0.02 \leq x \leq 0.15$, and $0.001 \leq y \leq 0.06$).

Patent Document 1 discloses a multilayered-type ceramic capacitor using the dielectric ceramic described above, and it is possible to obtain a multilayered-type ceramic capacitor in which the thickness of each ceramic layer is 2 μm, the number of effective dielectric ceramic layers is 5, the relative dielectric constant ∈r is 1,200 to 3,000, and the dielectric loss is 2.5% or less.

While the multilayered-type ceramic capacitor of Patent Document 1 utilizes the action of the ceramic itself as a dielectric, research and development has been actively carried out on semiconductor ceramic capacitors, which are different in principle.

A $SrTiO_3$-based grain boundary insulation type semiconductor ceramic is one of such semiconductor ceramic capacitors, in which a ceramic shaped body is subjected to firing (primary firing) in a strongly reducing atmosphere to make the ceramic shaped body semiconductive, and again firing (secondary firing) in an oxidizing atmosphere so that grain boundaries become dielectric. Although the relative dielectric constant ∈r of $SrTiO_3$ itself is low at about 200, since grain boundaries have capacitance, the apparent relative dielectric constant $\in r_{APP}$ can be increased by increasing the grain size to decrease the number of grain boundaries.

For example, Patent Document 2 proposes a $SrTiO_3$-based grain boundary insulation type semiconductor porcelain body in which the average grain size of crystal grains is 10 μm or less and the maximum grain size is 20 μm or less, and it is possible to obtain a semiconductor porcelain body having an apparent relative dielectric constant $\in r_{APP}$ of 9,000 when the average grain size of crystal grains is 8 μm, although it is a semiconductor ceramic capacitor having a single-layer structure.

Patent Document 1: Japanese Unexamined Patent Application Publication No. 11-302072
Patent Document 2: Japanese Patent No. 2689439

DISCLOSURE OF INVENTION

Problems to be Solved by the Invention

When a reduction in the thickness of ceramic layers and an increase in the number of ceramic layers to be stacked are promoted using the dielectric ceramic of Patent Document 1, the relative dielectric constant may decrease, the temperature characteristics of capacitance may degrade, or short-circuit failures may increase, all of which are problems.

Under these circumstances, it is difficult to put a thin-layer multilayered-type ceramic capacitor having a large capacitance, for example, of 100 μF or more into practical use because it is necessary to set the thickness of one dielectric ceramic layer at about 1 μm and to set the number of layers to be stacked to be about 700 to 1,000 layers.

Meanwhile, a $SrTiO_3$-based grain boundary insulation type semiconductor ceramic, such as the one described in Patent Document 2, has good frequency characteristics and temperature characteristics, a low dielectric loss tan δ, and low electric field dependence of apparent relative dielectric constant $\in r_{APP}$. Moreover, the $SrTiO_3$-based grain boundary insulation type semiconductor ceramic has varistor characteristics, and it is possible to prevent a component from being broken even if a high voltage is applied. Therefore, its application in the capacitor field is expected.

However, as described above, such a semiconductor ceramic has a high apparent relative dielectric constant $\in r_{APP}$ as a result of increasing the grain size of crystal grains. Consequently, if the grain size of crystal grains is decreased, the apparent relative dielectric constant $\in r_{APP}$ also decreases, resulting in a degradation in the dielectric characteristics. Therefore, it is difficult to achieve both a reduction in layer thickness and improvement in dielectric characteristics, which is a problem.

As is commonly known, the capacitance C of a capacitor is generally expressed by formula (1).

$$C = \in \cdot S/d \tag{1}$$

where ∈ is the dielectric constant, S is the electrode area, and d is the distance between electrodes.

As is obvious from formula (1), in order to increase the capacitance C, it is necessary to decrease the distance d between electrodes, and for that purpose, the thickness of a semiconductor ceramic layer must be decreased. Consequently, the average grain size of crystal grains constituting the semiconductor ceramic must be decreased. On the other hand, as described above, if the average grain size of crystal grains is decreased, the number of grain boundaries increases, resulting in a decrease in the apparent relative dielectric constant $\in r_{APP}$.

As described above, if the grain size of the known $SrTiO_3$-based grain boundary insulation type semiconductor ceramic capacitor is decreased in order to reduce the thickness of the semiconductor ceramic layer, the apparent relative dielectric constant $\in r_{APP}$ also decreases, resulting in a degradation in dielectric characteristics. Therefore, it is difficult to achieve both a reduction in layer thickness and improvement in dielectric characteristics, which is a problem.

The present invention has been achieved under these circumstances. It is an object of the invention to provide a $SrTiO_3$-based grain boundary insulation type semiconductor ceramic having a high apparent relative dielectric constant $\in r_{APP}$ of 5,000 or more even if the average grain size of crystal grains is decreased to 1 μm or less, and a multilayered-type semiconductor ceramic capacitor in which it is possible to achieve both a reduction in layer thickness and improvement in dielectric characteristics by using the SrTiO$_3$-based grain boundary insulation type semiconductor ceramic.

Means for Solving the Problems

As a result of diligent studies conducted by the present inventors to achieve the object described above, it has been found that by setting the molar quantity contained in the Sr site to be equal to the stoichiometric composition or in excess of the stoichiometric composition by a predetermined amount by dissolving a donor element, in an amount of 0.8 to 2.0 moles relative to 100 moles of the Ti element, in the Sr site to form a solid solution, the donor element having a higher valency than the Sr element, and by incorporating a predetermined transition metal element in an amount of 0.3 to 1.0 mole relative to 100 moles of the Ti element so as to be segregated in grain boundaries, it is possible to obtain a SrTiO$_3$-based grain boundary insulation type semiconductor ceramic having a high apparent relative dielectric constant $\in r_{APP}$ of 5,000 or more even if the average grain size of crystal grains is decreased to 1 μm or less.

The present invention has been achieved on the basis of the finding described above. A semiconductor ceramic according to the present invention is characterized by being a SrTiO$_3$-based grain boundary insulation type semiconductor ceramic in which the mixing molar ratio m between the Sr site and the Ti site satisfies the relationship $1.000 \leq m < 1.020$ and a donor element is dissolved, in an amount of 0.8 to 2.0 moles relative to 100 moles of the Ti element, in the Sr site to form a solid solution, the donor element having a higher valency than the Sr element, a transition metal element is incorporated in an amount of 0.3 to 1.0 mole relative to 100 moles of the Ti element so as to be segregated in grain boundaries, and the average grain size of crystal grains is 1.0 μm or less.

Furthermore, the semiconductor ceramic of the present invention is characterized in that the donor element contains at least one element of La and Sm.

Furthermore, the semiconductor ceramic of the present invention is characterized in that the transition metal element includes at least one element selected from Mn, Co, Ni, and Cr.

As a result of further diligent studies conducted by the present inventors, it has been found that by incorporating a low-melting-point oxide in an amount of 0.1 moles or less relative to 100 moles of the Ti element, segregation of the transition metal element into grain boundaries can be accelerated.

That is, the semiconductor ceramic of the present invention is characterized in that a low-melting-point oxide is incorporated in an amount of 0.1 moles or less relative to 100 moles of the Ti element.

Furthermore, the semiconductor ceramic of the present invention is characterized in that the low-melting-point oxide is SiO$_2$.

Furthermore, a multilayered-type semiconductor ceramic capacitor according to the present invention is characterized by including a component body composed of the semiconductor ceramic, an internal electrode provided in the component body, and an external electrode provided on a surface of the component body, the external electrode being electrically connectable to the internal electrode.

Advantages

According to the SrTiO$_3$-based grain boundary insulation type semiconductor ceramic of the present invention, the mixing molar ratio m between the Sr site and the Ti site satisfies the relationship $1.000 \leq m < 1.020$, a donor element, such as La or Sm, is dissolved, in an amount of 0.8 to 2.0 moles relative to 100 moles of the Ti element, in the Sr site to form a solid solution, the donor element having a higher valency than the Sr element, a transition metal element, such as Mn, Co, Ni, or Cr, is incorporated in an amount of 0.3 to 1.0 mole relative to 100 moles of the Ti element so as to be segregated in grain boundaries, and the average grain size of crystal grains is 1.0 μm or less. Consequently, it is possible to obtain a semiconductor ceramic having a high apparent relative dielectric constant $\in r_{APP}$ of 5,000 or more even if the average grain size of crystal grains is 1.0 μm or less, and it is possible to obtain a semiconductor ceramic having a higher capacitance than the known dielectric ceramic even if the layer thickness is small.

Furthermore, since the low-melting-point oxide, such as SiO$_2$, is incorporated in an amount of 0.1 moles or less relative to 100 moles of the Ti element, segregation of Mn, Co, Ni, or Cr into grain boundaries is accelerated, and a semiconductor ceramic having desired dielectric characteristics can be easily obtained.

Furthermore, according to the multilayered-type semiconductor ceramic capacitor of the present invention, a component body is composed of the semiconductor ceramic, an internal electrode is provided in the component body, and an external electrode is provided on a surface of the component body, the external electrode being electrically connectable to the internal electrode. Consequently, it is possible to obtain a multilayered-type semiconductor ceramic capacitor having a high apparent relative dielectric constant $\in r_{APP}$ even if the thickness of semiconductor ceramic layers constituting the component body is decreased to about 1 μm. Consequently, it is possible to materialize a multilayered-type semiconductor ceramic capacitor having a smaller layer thickness and a higher capacitance than the known multilayered-type semiconductor ceramic capacitor.

Figure 1:
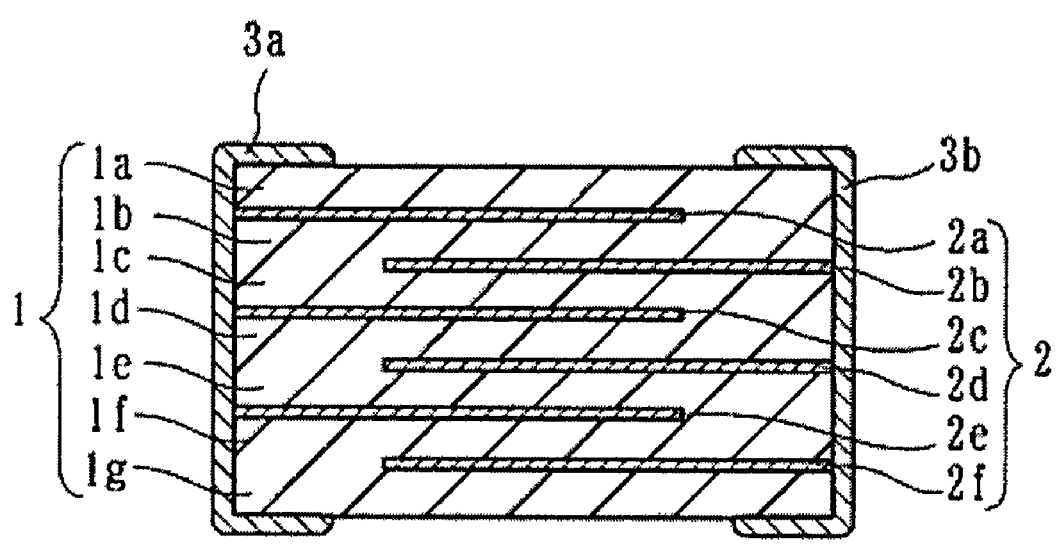
FIG. 1 is a cross-sectional view schematically showing an embodiment of a multilayered-type semiconductor ceramic capacitor fabricated using a semiconductor ceramic according to the present invention.

REFERENCE NUMERALS 1 component body
1a to 1g semiconductor ceramic layer
2 internal electrode

BEST MODES FOR CARRYING OUT THE INVENTION

Embodiments of the present invention will be described in detail below.

A semiconductor ceramic according to an embodiment of the present invention is a SrTiO$_3$-based grain boundary insulation type semiconductor ceramic in which the mixing molar ratio m between the Sr site and the Ti site satisfies the relationship $1.000 \leq m < 1.020$, a donor element is dissolved, in an amount of 0.8 to 2.0 moles relative to 100 moles of the Ti element, in the Sr site to form a solid solution, the donor element having a higher valency than the Sr element, a transition metal element is incorporated in an amount of 0.3 to 1.0 mole relative to 100 moles of the Ti element so as to be segregated in grain boundaries, and the average grain size of crystal grains is 1.0 μm or less.

By dissolving the donor element in an amount of 0.8 to 2.0 moles relative to 100 moles of the Ti element in the Sr site to form a solid solution, the ceramic can be made semiconductive. By setting the mixing molar ratio m between the Sr site and the Ti site to satisfy the relationship $1.000 \leq m < 1.020$ so that the molar quantity contained in the Sr site is equal to or in excess of the stoichiometric composition and by incorporating a transition metal element in an amount of 0.3 to 1.0 mole relative to 100 moles of the Ti element so as to be segregated in grain boundaries, it is possible to increase the apparent relative dielectric constant $\in r_{APP}$ while maintaining a satisfactory dielectric loss tan δ.

Specifically, it is possible to obtain a semiconductor ceramic having an apparent relative dielectric constant $\in r_{APP}$ of 5,000 or more even if the average grain size of crystal grains is 1.0 μm or less. Consequently, the semiconductor ceramic is suitable for reducing the layer thickness and increasing the number of layers to be stacked, and it is possible to obtain a multilayered-type semiconductor ceramic capacitor having a small size and a high capacitance. That is, compared to a multilayered-type ceramic capacitor such as the one described in Patent Document 1, a multilayered-type semiconductor ceramic capacitor using the semiconductor ceramic of the present invention can have an equivalent capacitance even if the number of layers stacked is about one-half. Furthermore, when the number of layers stacked is the same, it is possible to obtain a capacitor having a higher capacitance that is about two times that of the known multi-layered-type ceramic capacitor.

The reasons for limiting the mixing molar ratio m, the molar quantities of the donor element and the transition metal element contained to the ranges described above will be described below.

(1) Mixing Molar Ratio m

The mixing molar ratio m between the Sr site and the Ti site affects the dielectric characteristics of the semiconductor ceramic and the average grain size of crystal grains.

That is, if the mixing molar ratio m is less than 1.000 and the molar quantity contained in the Ti site is in excess of the stoichiometric composition, the grain size of crystal grains increases, and it becomes difficult to obtain a semiconductor ceramic having an average grain size of crystal grains of 1 μm or less. On the other hand, if the mixing molar ratio m is 1.020 or more, the deviation from the stoichiometric composition increases, resulting in difficulty in sintering.

Therefore, the mixing molar ratio is adjusted so as to satisfy the relationship $1.000 \leq m < 1.020$.

(2) Molar quantity of donor element By dissolving a donor element having a higher valency than the Sr element in the Sr site to form a solid solution and by carrying out a firing treatment in a reducing atmosphere, the ceramic can be made semiconductive. The molar quantity of the donor element contained affects the apparent relative dielectric constant $\in r_{APP}$. That is, if the amount of the donor element is less than 0.8 moles relative to 100 moles of the Ti element, it is not possible to obtain a desired high apparent relative dielectric constant $\in r_{APP}$. On the other hand, if the amount of the donor element exceeds 2.0 moles relative to 100 moles of Ti, the solid solution limit in the Sr site is exceeded, and the donor element is precipitates in the grain boundaries. As a result, the apparent relative dielectric constant $\in r_{APP}$ decreases extremely, resulting in a degradation in dielectric characteristics.

Therefore, the molar quantity of the donor element contained is adjusted to be 0.8 to 2.0 moles relative to 100 moles of Ti.

Although any donor element that dissolves in the Sr site to form a solid solution and has a higher valency than the Sr element may be used as the donor element without particular limitation, a rare-earth element, such as La or Sm, is preferably used.

(3) Molar Quantity of Transition Metal Element

When a transition metal element is incorporated into a semiconductor ceramic so as to be segregated in grain boundaries, the transition metal element adsorbs oxygen in the grain boundaries, and thus dielectric characteristics can be improved.

However, if the molar quantity of the transition metal element contained is less than 0.3 moles relative to 100 moles of the Ti element, the desired effect by the addition of the transition metal element cannot be obtained, and the capacitance cannot be improved sufficiently. On the other hand, if the molar quantity of the transition metal element contained exceeds 1.0 mole relative to 100 moles of the Ti element, the transition metal element is dissolved in the Ti site to form a solid solution, resulting in degradation in dielectric characteristics, and moreover, the average grain size becomes 1 μm or more, thus causing coarsening of crystal grains.

Therefore, the molar quantity of the transition metal element contained is adjusted to be 0.3 to 1.0 mole relative to 100 moles of the Ti element.

As the transition metal element, although not particularly limited, Mn, Co, Ni, Cr, or the like may be used, and in particular, Mn is preferably used.

Furthermore, it is also preferable to incorporate a low-melting-point oxide, in an amount of 0.1 moles or less relative to 100 moles of the Ti element, in the semiconductor ceramic. By the incorporation of the low-melting-point oxide, sinterability can be improved, and segregation of the transition metal element into grain boundaries can be accelerated.

The reason for setting the molar quantity of the low-melting-point oxide contained in the above range is that if the molar quantity exceeds 0.1 moles relative to 100 moles of the Ti element, the apparent relative dielectric constant $\in r_{APP}$ is decreased, and the desired dielectric characteristics cannot be obtained.

As the low-melting-point oxide, although not particularly limited, $SiO_2$, a glass ceramic containing B or an alkali metal element (K, Li, Na, or the like), a copper-tungsten oxide, or the like may be used, and $SiO_2$ is preferably used.

Furthermore, the average grain size of crystal grains of the semiconductor ceramic can be easily controlled to 1 μm or less by controlling the fabrication conditions coupled with the compositional ranges described above.

FIG. 1 is a cross-sectional view schematically showing an embodiment of a multilayered-type semiconductor ceramic capacitor fabricated using a semiconductor ceramic according to the present invention.

In the multilayered-type semiconductor ceramic capacitor, internal electrodes 2 (2a to 2f) are embedded in a component body 1 composed of a semiconductor ceramic of the present invention, and external electrodes 3a and 3b are disposed on both sides of the component body 1.

That is, the component body 1 has a structure composed of a sintered laminate including a plurality of semiconductor ceramic layers 1a to 1g, in which the semiconductor ceramic layers 1a to 1g and the internal electrodes 2a to 2f are alternately stacked. The internal electrodes 2a, 2c, and 2e are electrically connected to the external electrode 3a, and the internal electrodes 2b, 2d, and 2f are electrically connected to the external electrode 3b. A capacitance is formed between two opposing surfaces, i.e., between each of the internal electrodes 2a, 2c, and 2e and each of the internal electrodes 2a, 2d, and 2f.

The multilayered-type semiconductor ceramic capacitor is fabricated by the method described below.

First, as ceramic starting materials, a Sr compound, such as $SrCO_3$, a donor compound containing a donor element, such as La or Sm, and a Ti compound, such as $TiO_2$, in which preferably, the specific surface area is set at 10 $m^2/g$ or more (average grain size: about 0.1 μm or less), are prepared, the donor compound is weighed so that the molar quantity of the donor element is 0.8 to 2.0 moles relative to 100 moles of the Ti element, and the Sr compound and the Ti compound are weighed so that the mixing molar ratio m satisfies the relationship $1.000 \leq m < 1.020$.

Next, a predetermined amount of a dispersant is added to the weighed materials, and the resulting mixture is placed in a ball mill together with grinding media, such as PSZ (Partially Stabilized Zirconia) balls, and water. Wet mixing is performed thoroughly in the ball mill to form a slurry.

Next, the slurry is dried by evaporation, and then a calcination treatment is carried out in an air atmosphere at a predetermined temperature (e.g., 1,300° C. to 1,450° C.) for about two hours. Thereby, a calcined powder of a semiconductor in which the donor element has been dissolved to form a solid solution is obtained.

Next, a low-melting-point oxide, such as $SiO_2$, is added to the calcined powder so that the molar quantity of the low-melting-point oxide is 0 to 0.1 moles relative to 100 moles of the Ti element. The calcined powder, water, and as necessary, a dispersant, are placed in a ball mill, and wet mixing is performed thoroughly in the ball mill, followed by drying by evaporation. Then, a heat treatment is carried out in an air atmosphere at a predetermined temperature (e.g., 600° C.) for about five hours to form heat-treated powder.

Next, a transition metal compound is added thereto so that the molar quantity of a transition metal element, such as Mn, is 0.3 to 1.0 mole relative to 100 moles of the Ti element, and an organic solvent, such as toluene or an alcohol, and a dispersant in appropriate amounts are further added thereto. Then, the resulting mixture is again placed in a ball mill together with grinding media and water, and wet mixing is performed thoroughly in the ball mill. An organic binder and a plasticizer in appropriate amounts are added thereto, and wet mixing is performed thoroughly for a long period of time. Thereby, a ceramic slurry is obtained.

Next, the ceramic slurry is subjected to forming using a forming process, such as a doctor blade process, and a ceramic green sheet is formed such that the thickness after firing is a predetermined thickness (e.g., about 1 to 2 μm).

Next, screen printing is performed on the ceramic green sheet using a conductive paste for an internal electrode, and thus a conductive film having a predetermined pattern is formed on the surface of the ceramic green sheet.

The conductive material to be contained in the conductive paste for internal electrode is not particularly limited. However, in view of the reliability of ohmic contact with the semiconductor ceramic layer and low cost, use of a base metal material, such as Ni or Cu, is preferable.

Next, a plurality of ceramic green sheets provided with the conductive film are stacked in a predetermined direction and sandwiched between ceramic green sheets not provided with the conductive film. Then, pressure bonding is performed, followed by cutting to a predetermined size, to form a ceramic laminate.

Subsequently, in an air atmosphere, a debinding treatment is carried out at a temperature of 300° C. to 500° C. Then a primary firing is performed in a strongly reducing atmosphere in which $H_2$ gas and $N_2$ gas are adjusted to a predetermined flow ratio (e.g., $H_2:N_2=1:100$) at a temperature of 1,150° C. to 1,300° C. for two hours to make the ceramic laminate semiconductive. That is, by performing primary firing at a low temperature equal to or lower than the calcining temperature (1,300° C. to 1,450° C.), the ceramic laminate is made semiconductive.

Subsequently, a secondary firing is performed in an air atmosphere at a low temperature of 600° C. to 900° C. for one hour so that the internal electrode material, such as Ni or cu, is not oxidized, and the semiconductor ceramic is reoxidized to form a grain boundary insulating layer. Thereby, a component body 1 in which internal electrodes 2 are embedded is produced.

Next, a conductive paste for an external electrode is applied to both sides of the component body 1, and a baking treatment is performed to form external electrodes 3a and 3b. Thereby, a multilayered-type semiconductor ceramic capacitor is produced.

As a conductive material contained in the conductive paste for external electrode, although not particularly limited, a material, such as Ga, In, Ni, or Cu, that is suitable for ohmic contact is preferably used. Furthermore, it is also possible to form an Ag electrode on each of the electrodes suitable for ohmic contact.

As another method for forming the external electrodes 3a and 3b, after the conductive paste for external electrode is applied to both side of the ceramic laminate, firing may be performed on the applied paste simultaneously with the secondary firing.

Since the multilayered-type semiconductor ceramic capacitor is fabricated using the semiconductor ceramic described above, the thickness of the semiconductor layers 1a to 1g can be decreased to 1 μm or less. Moreover, even if the layer thickness is decreased, the apparent relative dielectric constant $\in r_{APP}$ per layer can be increased to 5,000 or more. Thus, a multilayered-type semiconductor ceramic capacitor having a small size and a high capacitance can be obtained. Furthermore, it is not necessary in this multilayered-type semiconductor ceramic capacitor to take the polarity into consideration, compared with a tantalum capacitor having a high capacitance, and the capacitor is easy to handle and has low resistance even in high frequency ranges. Therefore, the multilayered-type semiconductor ceramic capacitor is useful as an alternative to the tantalum capacitor.

Furthermore, as described in the "Problems to be Solved by the Invention" section, the $SrTiO_3$-based grain boundary insulation type semiconductor ceramic is known to have varistor characteristics. In this embodiment, since the average grain size of crystal grains is very small at 1 μm or less, the varistor voltage can be increased. Consequently, by using the semiconductor ceramic as a capacitor in the ordinary electric field intensity region (e.g., 1 V/μm) where the voltage-current characteristic has linearity, the versatility of the capacitor is enhanced. Moreover, it is possible to prevent the component from being broken even if an abnormally high voltage is applied to the component because of the varistor characteristics. Thus, a highly reliable capacitor can be obtained.

Furthermore, as described above, since the varistor voltage can be increased, it is possible to realize a capacitor that can prevent breaking due to a surge voltage or the like. In a low-capacitance capacitor used in an ESD (electro-static discharge) application, surge withstand capability is required, and since the breakdown voltage is high, the capacitor according to this embodiment can be used as a capacitor in which ESD withstand capability is guaranteed.

Although FIG. 1 shows a multilayered-type semiconductor ceramic capacitor in which a plurality of semiconductor ceramic layers 1a to 1g and the internal electrodes 2a to 2f are alternately stacked, it is also possible to provide a multilayered-type semiconductor ceramic capacitor having a structure in which an internal electrode is formed by vapor deposition on each of several (e.g., two or three) semiconductor ceramic single sheets (e.g., with a thickness of about 200 μm), and the single sheets are laminated together with an adhesive or the like. Such a structure is effective, for example, for a multilayered-type semiconductor ceramic capacitor used in low-capacitance applications.

In addition, the present invention is not limited to the embodiment described above. Although the solid solution is formed by the solid-phase method in the embodiment described above, the method for forming the solid solution is not particularly limited. Any method, such as a hydrothermal synthesis method, a sol-gel method, a hydrolysis method, or a coprecipitation method, may be used.

The secondary firing (reoxidation treatment) for forming the grain boundary insulating layer in the embodiment described above is performed in an air atmosphere. It is also possible to obtain the desired effect even by slightly decreasing the oxygen concentration from the air atmosphere according to need.

Examples of the present invention will be specifically described below.

The present inventors fabricated single-layered semiconductor ceramic capacitors in Examples 1 to 3 and dielectric characteristics were evaluated.

EXAMPLE 1

As ceramic starting materials, $SrCO_3$, $LaCl_3$, and $TiO_2$ having a specific surface area of 30 $m^2/g$ (average grain size: about 30 nm) were prepared, and these ceramic starting materials were weighed so as to satisfy the compositions shown in Table 1. Furthermore, an ammonium salt of polycarboxylic acid in an amount of 2 parts by weight relative to 100 parts by weight of the weighed materials was added as a dispersant, and the resulting mixture was placed in a ball mill together with PSZ balls with a diameter of 2 mm and water. Wet mixing was performed in the ball mill for 16 hours to form a slurry.

Next, the slurry was dried by evaporation, and then a calcination treatment was carried out in an air atmosphere at 1,400° C. for two hours. Thereby, a calcined powder of a semiconductor in which the La element had been dissolved to form a solid solution was obtained.

Ethyl silicate ($Si(OC_2H_5)_4$) was then added so that the molar quantity of $SiO_2$ contained relative to 100 moles of the Ti element was as shown in Table 1, and the resulting mixture was again placed in a ball mill together with PSZ balls with a diameter of 2 mm and water. Wet mixing was performed in the ball mill for 16 hours, followed by drying by evaporation. Then, a heat treatment was performed in an air atmosphere at 600° C. for five hours to form a heat-treated powder.

Next, a manganese octylate ($Mn(C_7H_{15})_2$) solution was added so that the molar quantity of MnO contained relative to 100 moles of the Ti element was as shown in Table 1, and an organic solvent, such as toluene or an alcohol, and the ammonium salt of polycarboxylic acid in appropriate amounts were added to the heat-treated powder. The resulting mixture was again placed in a ball mill together with PSZ balls with a diameter of 2 mm and water, and wet mixing was performed in the ball mill for four hours. Then, polyvinyl butyral (PVB) as a binder and dioctyl phthalate (DOP) as a plasticizer in appropriate amounts were added thereto, and wet mixing was further performed for 16 hours. Thereby, a ceramic slurry was formed.

The ceramic slurry was subjected to forming using a doctor blade process, and a ceramic green sheet was formed and then die-cut into a predetermined size. The resulting ceramic green sheets were stacked so that the thickness was about 1 mm, and pressure bonding was performed to form a ceramic shaped body.

Next, the ceramic shaped body was cut into a size of 5 mm in length and 5 mm in width, and a debinding treatment was carried out in an air atmosphere at 400° C. for 10 hours. A primary firing was then performed in a strongly reducing atmosphere in which the flow ratio was adjusted to $H_2:N_2=1:100$, at a temperature of 1,150° C. to 1,300° C. for two hours to make the ceramic shaped body partially semiconductive. Then, a secondary firing was performed in an air atmosphere at a temperature of 900° C. for one hour to carry out a reoxidation treatment. Thereby, a grain boundary insulation type semiconductor ceramic was produced.

Next, In—Ga was applied to both sides of the semiconductor ceramic. In such a manner, Sample Nos. 1 to 15 were prepared.

Each sample was observed with a scanning electron microscope (SEM), and SEM photographs of the surface and a broken-out section of the sample were subjected to image analysis. Thereby, the average grain size of crystal grains (average crystal grain size) was determined.

Furthermore, the capacitance was measured at a frequency of 1 kHz and a voltage of 1 V using an impedance analyzer (HP 4194A manufactured by Hewlett-Packard Company) with respect to each sample. The apparent relative dielectric constant $\in r_{APP}$ was calculated from the measured capacitance and the size of the sample.

Using the impedance analyzer, the dielectric loss tan δ was measured.

Table 1 shows the compositions and measurement results with respect to Sample Nos. 1 to 15.

TABLE 1

| | | Element | | Additive material | | Dielectric characteristics | | |
|---|---|---|---|---|---|---|---|---|
| | | dissolved to | | | | Apparent | | |
| | Mixing | form solid | | | | relative | Dielectric | Average |
| | molar | solution | | | | dielectric | loss | crystal |
| Sample | ratio | La | | MnO | $SiO_2$ | constant | tan δ | grain size |
| No. | m | (mol) | | (mol) | (mol) | $\in r_{APP}$ | (%) | (μm) |
| 1 | 1.005 | 0.8 | | 0.3 | 0.1 | 5120 | 1.1 | 0.4 |
| 2 | 1.005 | 0.8 | | 0.5 | 0.1 | 6520 | 1.2 | 0.5 |
| 3 | 1.005 | 0.8 | | 1.0 | 0.1 | 6760 | 0.8 | 0.6 |

TABLE 1-continued

| | | Element | Additive material | | Dielectric characteristics | | |
|---|---|---|---|---|---|---|---|
| | Mixing molar | dissolved to form solid solution | | | Apparent relative dielectric | Dielectric loss | Average crystal |
| Sample No. | ratio m | La (mol) | MnO (mol) | SiO$_2$ (mol) | constant $\in r_{APP}$ | tan δ (%) | grain size (μm) |
| 4   | 1.005 | 0.8  | 0.5  | 0   | 6430 | 0.9 | 0.4 |
| 5   | 1.005 | 1.6  | 0.5  | 0.1 | 6310 | 1.0 | 0.5 |
| 6   | 1.005 | 2.0  | 0.5  | 0.1 | 6230 | 1.3 | 0.4 |
| 7   | 1.000 | 0.8  | 0.5  | 0.1 | 5880 | 1.4 | 0.7 |
| 8   | 1.010 | 0.8  | 0.5  | 0.1 | 6610 | 1.5 | 0.3 |
| 9*  | 0.995 | 0.8  | 0.5  | 0.1 | 4700 | 0.9 | 1.0 |
| 10* | 1.020 | 0.8  | 0.5  | 0.1 | —    | —   | —   |
| 11* | 1.005 | 0.6  | 0.5  | 0.1 | 4000 | 0.7 | 0.5 |
| 12* | 1.005 | 2.3  | 0.5  | 0.1 | 1920 | 1.7 | 0.4 |
| 13* | 1.005 | 0.8  | 0.25 | 0.1 | 2500 | 1.3 | 0.5 |
| 14* | 1.005 | 0.8  | 1.5  | 0.1 | 4500 | 1.2 | 1.8 |
| 15* | 1.005 | 0.8  | 0.5  | 0.2 | 3500 | 1.0 | 0.8 |

*Out of the range of the present invention

As is evident from Table 1, the mixing molar ratio in Sample No. 9 m was 0.995 and the molar quantity contained in the Ti site was in excess of the stoichiometric composition. Consequently, although the average crystal grain size was 1.0 μm, the apparent relative dielectric constant $\in r_{APP}$ was 4,700 (i.e., equal to or less than 5,000). It was not possible to obtain the desired high apparent relative dielectric constant $\in r_{APP}$.

In Sample No. 10, the mixing molar ratio m was 1.020, and the molar quantity contained in the Sr site was excessive. Consequently, sintering was difficult, and it was not possible to measure the average crystal grain size or the dielectric characteristics.

Since the molar quantity of La (donor element) contained was 0.6 moles (i.e., less than 0.8 moles) relative to 100 moles of the main component in Sample No. 11, the apparent relative dielectric constant $\in r_{APP}$ was decreased to 4,000 (i.e., less than 5,000).

In Sample No. 12, the apparent relative dielectric constant $\in r_{APP}$ was extremely low, 1,920, since the molar quantity of La (donor element) contained was excessive at 2.3 moles relative to 100 moles of the main component.

Since the molar quantity of MnO contained was 0.25 moles (less than 0.3 moles) relative to 100 moles of the main component in Sample No. 13, the apparent relative dielectric constant $\in r_{APP}$ was 2,500 (i.e., less than 5,000).

In Sample No. 14, the apparent relative dielectric constant $\in r_{APP}$ was 4,500 (i.e., less than 5,000) since the molar quantity of MnO contained was 1.5 moles (i.e., more than 1.0 mole) relative to 100 moles of the main component. Moreover, the average crystal grain size was large at 1.8 μm, and thus it was found that it was difficult to decrease the thickness of layer to a desired value.

since the molar quantity of SiO$_2$ in Sample No. 15 was 0.2 moles (i.e., more than 0.1 moles) relative to 100 moles of the main component, the apparent relative dielectric constant $\in r_{APP}$ was decreased to 3,500 (i.e., less than 5,000).

In contrast, the mixing molar ratio m satisfied the relationship $1.000 \leq m < 1.020$, the molar quantity of La (donor element) was 0.8 to 2.0 moles relative to 100 moles of the Ti element, and the molar quantity of MnO contained was 0.3 to 1.0 mole relative to 100 moles of the Ti element in Sample Nos. 1 to 8. Furthermore, even when SiO$_2$ was incorporated, the molar quantity of SiO$_2$ contained was 0.1 moles or less relative to 100 moles of the main component. Consequently, the average crystal grain size was 0.3 to 0.6 μm (i.e., less than 1.0 μm). Moreover, the apparent relative dielectric constant $\in r_{APP}$ was 5,120 to 6,760 (i.e., more than 5,000). Consequently, it was possible to obtain a semiconductor ceramic having a high apparent relative dielectric constant $\in r_{APP}$ of 5,000 or more even when the average crystal grain size was 1 μm or less.

EXAMPLE 2

As ceramic starting materials, Sr(OH)$_2$.8H$_2$O, LaCl$_3$, and TiO$_2$ having a specific surface area of 300 m$^2$/g (average grain size: about 5 nm) were prepared, and these ceramic starting materials were weighed so as to satisfy the compositions shown in Table 2. Next, pure water was added thereto such that the volume of the solid solution slurry was $4.0 \times 10^{-4}$ m$^3$ (400 cc), and the resulting mixture was placed in a beaker made of a fluorocarbon resin. Then, the beaker was set in a stirring-type autoclave, and a hydrothermal synthesis reaction was caused at a temperature of 200° C. and at 8.5 s$^{-1}$ (500 rpm) (pressure: about $1.5 \times 10^5$ Pa) for four hours. Thereby, a slurry in which the La element was homogeneously contained at the nanometer level was formed.

The resulting slurry was dried by evaporation to form a powder. Then, an ammonium salt of polycarboxylic acid in an amount of 2 parts by weight relative to 100 parts by weight of the powder was added as a dispersant, and the resulting mixture was placed in a ball mill together with PSZ balls having a diameter of 2 mm and water. Wet pulverization was performed in the ball mill for 16 hours, followed by drying by evaporation. A calcining treatment was carried out in an air atmosphere at 1,400° C. for two hours. Thereby, a calcined semiconductor powder in which the La element was dissolved to form a solid solution was obtained.

Subsequently, in the same manner/procedure as in Example 1, addition of SiO$_2$, wet mixing, drying, heat treatment, addition of Mn, wet mixing, drying, heat treatment, forming, debinding treatment, primary firing, secondary firing, and electrode formation were performed in that order. Thereby, Sample Nos. 21 to 23 were prepared.

The average crystal grain size, the apparent relative dielectric constant $\in r_{APP}$, and the dielectric loss tan δ with respect to each sample, were measured by the same methods/procedures as in Example 1.

Table 2 shows the compositions and measurement results for Sample Nos. 21 to 23.

TABLE 2

| Sample No. | Mixing molar ratio m | Element dissolved to form solid solution La (mol) | Additive material | | Dielectric characteristics | | |
|---|---|---|---|---|---|---|---|
| | | | MnO (mol) | $SiO_2$ (mol) | Apparent relative dielectric constant $\epsilon r_{APP}$ | Dielectric loss tan δ (%) | Average crystal grain size (μm) |
| 21 | 1.005 | 0.8 | 0.5 | 0.05 | 6560 | 1.0 | 0.6 |
| 22 | 1.010 | 0.8 | 0.7 | 0.1 | 7010 | 0.9 | 0.4 |
| 23 | 1.013 | 0.8 | 1.0 | 0.1 | 6920 | 1.1 | 0.3 |

In Example 2, the solid solution slurries were formed by the hydrothermal synthesis method. In the resulting semiconductor ceramics, the average crystal grain size was 0.3 to 0.6 μm (i.e., 1.0 μm or less), and moreover, it was possible to obtain an apparent relative dielectric constant $\epsilon r_{APP}$ of 6,560 to 7,010 (5,000 or more). Example 2 confirms that regardless of the method for forming the solid solution, it was possible to obtain a semiconductor ceramic having a high apparent relative dielectric constant $\epsilon r_{APP}$ of 5,000 or more even if the average crystal grain size is 1 μm or less.

EXAMPLE 3

Sample Nos. 31 to 33 were formed by the same method/procedure as in Example 1 except that $SmCl_3$ was used as the additive material instead of $LaCl_3$. The average crystal grain size, the apparent relative dielectric constant $\epsilon r_{APP}$, and the dielectric loss tan δ, were measured by the same methods/procedures as in Example 1.

Table 3 shows the compositions and measurement results for Sample Nos. 31 to 33.

TABLE 3

| Sample No. | Mixing molar ratio m | Element dissolved to form solid solution Sm (mol) | Additive material | | Dielectric characteristics | | |
|---|---|---|---|---|---|---|---|
| | | | MnO (mol) | $SiO_2$ (mol) | Apparent relative dielectric constant $\epsilon r_{APP}$ | Dielectric loss tan δ (%) | Average crystal grain size (μm) |
| 31 | 1.002 | 1.2 | 0.4 | 0.05 | 5850 | 1.4 | 0.6 |
| 32 | 1.004 | 1.6 | 0.5 | 0 | 6310 | 0.9 | 0.8 |
| 33 | 1.008 | 1.8 | 0.9 | 0.07 | 6750 | 0.8 | 0.7 |

In Example 3, Sm was used as the element dissolved to form a solid solution. In the resulting semiconductor ceramics, the average crystal grain size was 0.6 to 0.8 μm (i.e., 1.0 μm or less), and moreover, the apparent relative dielectric constant $\epsilon r_{APP}$ was 5,850 to 6,750 (i.e., 5,000 or more). Example 3 confirms that if a donor element that is dissolved in the Sr site to form a solid solution is used, it is possible to obtain a semiconductor ceramic having a high apparent relative dielectric constant $\epsilon r_{APP}$ of 5,000 or more even when the average crystal grain size is 1 μm or less, as in Examples 1 and 2.

The invention claimed is:

1. A $SrTiO_3$-based grain boundary insulation type semiconductor ceramic in which
the molar ratio m between the Sr site and the Ti site satisfies the relationship 1.000≦m<1.020;
0.8 to 2.0 moles relative to 100 moles of the Ti element of a donor element having a higher valency than the Sr element is dissolved in the Sr site to form a solid solution;
a transition metal element is present in an amount of 0.3 to 1.0 mole relative to 100 moles of the Ti element so as to be segregated in grain boundaries; and
the average grain size of crystal grains is 1.0 μm or less, and said ceramic being a grain boundary insulation type semiconductor ceramic.

2. The semiconductor ceramic according to claim 1, wherein the donor element contains at least one of La and Sm.

3. The semiconductor ceramic according to claim 2, wherein the transition metal element is at least one element selected from the group consisting of Mn, Co, Ni, and Cr.

4. The semiconductor ceramic according to claim 3, containing a low-melting-point oxide in an amount of 0.1 moles or less relative to 100 moles of the Ti element.

5. The semiconductor ceramic according to claim 4, wherein the low-melting-point oxide is $SiO_2$.

6. The semiconductor ceramic according to claim 5, wherein 1.005≦m<1.013; the amount of donor element is 0.8 to 1.6 moles relative to 100 moles of the Ti element; the transition metal element is Mn and the amount thereof is 0.5 to 0.9 relative to 100 moles of the Ti element; and the average grain size of crystal grains is 0.8 μm or less.

7. A multilayered-type semiconductor ceramic capacitor comprising a component body comprising the semiconductor ceramic according to claim 6, an internal electrode in the component body, and an external electrode on a surface of the component body, the external electrode being electrically connected to the internal electrode.

8. A multilayered-type semiconductor ceramic capacitor comprising a component body comprising the semiconductor ceramic according to claim 4, an internal electrode in the component body, and an external electrode on a surface of the component body, the external electrode being electrically connected to the internal electrode.

9. A multilayered-type semiconductor ceramic capacitor comprising a component body comprising the semiconductor ceramic according to claim 3, an internal electrode in the component body, and an external electrode on a surface of the component body, the external electrode being electrically connected to the internal electrode.

10. A multilayered-type semiconductor ceramic capacitor comprising a component body comprising the semiconductor ceramic according to claim 2, an internal electrode in the component body, and an external electrode on a surface of the component body, the external electrode being electrically connected to the internal electrode.

11. The semiconductor ceramic according to claim 1, wherein the transition metal element is at least one element selected from the group consisting of Mn, Co, Ni, and Cr.

12. The semiconductor ceramic according to claim 11, containing a low-melting-point oxide in an amount of 0.1 moles or less relative to 100 moles of the Ti element.

13. The semiconductor ceramic according to claim 12, wherein the low-melting-point oxide is $SiO_2$.

14. A multilayered-type semiconductor ceramic capacitor comprising a component body comprising the semiconductor ceramic according to claim 13, an internal electrode in the component body, and an external electrode on a surface of the component body, the external electrode being electrically connected to the internal electrode.

15. A multilayered-type semiconductor ceramic capacitor comprising a component body comprising the semiconductor ceramic according to claim 12, an internal electrode in the component body, and an external electrode on a surface of the component body, the external electrode being electrically connected to the internal electrode.

16. A multilayered-type semiconductor ceramic capacitor comprising a component body comprising the semiconductor ceramic according to claim 11, an internal electrode in the component body, and an external electrode on a surface of the component body, the external electrode being electrically connected to the internal electrode.

17. The semiconductor ceramic according to claim 1, containing a low-melting-point oxide in an amount of 0.1 moles or less relative to 100 moles of the Ti element.

18. The semiconductor ceramic according to claim 17, wherein the low-melting-point oxide is $SiO_2$.

19. A multilayered-type semiconductor ceramic capacitor comprising a component body comprising the semiconductor ceramic according to claim 17, an internal electrode in the component body, and an external electrode on a surface of the component body, the external electrode being electrically connected to the internal electrode.

20. A multilayered-type semiconductor ceramic capacitor comprising a component body comprising the semiconductor ceramic according to claim 1, an internal electrode in the component body, and an external electrode on a surface of the component body, the external electrode being electrically connected to the internal electrode.

* * * * *